(12) United States Patent  (10) Patent No.: US 7,406,199 B2
Lindeman  (45) Date of Patent: Jul. 29, 2008

(54) EVENT CAPTURE AND FILTERING SYSTEM (75) Inventor: Robert Lindeman, Centennial, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 987 days.

(21) Appl. No.: 10/843,845

(22) Filed: May 12, 2004

(65) Prior Publication Data

US 2005/0254712 A1 Nov. 17, 2005

(51) Int. Cl.
G06K 9/62 (2006.01)
G06K 9/54 (2006.01)
G01C 21/00 (2006.01)
H04N 7/00 (2006.01)

(52) U.S. Cl. ............... 382/224; 382/305; 701/200; 348/113

(58) Field of Classification Search ............ 382/103, 382/106, 224, 260, 305, 312; 340/517; 701/200; 707/1, 100, 200; 348/113, 116, 117
See application file for complete search history.

(56) References Cited

U.S. PATENT DOCUMENTS

| 5,451,960 | A | | 9/1995 | Kastella et al. |
| 5,457,460 | A | | 10/1995 | Tran et al. |
| 5,458,041 | A | * | 10/1995 | Sun et al. .................... 89/1.11 |
| 6,408,404 | B1 | | 6/2002 | Ladwig |
| 6,469,660 | B1 | * | 10/2002 | Horvath et al. ............... 342/179 |
| 6,525,658 | B2 | | 2/2003 | Streetman et al. |
| 6,542,810 | B2 | | 4/2003 | Lai |
| 6,584,879 | B2 | * | 7/2003 | Gorman ....................... 89/1.11 |
| 6,591,084 | B1 | * | 7/2003 | Chuprun et al. ............. 455/3.05 |
| 6,801,843 | B2 | * | 10/2004 | Rao et al. ..................... 701/45 |
| 6,941,557 | B1 | * | 9/2005 | Jakobson et al. ............ 719/316 |
| 7,131,136 | B2 | * | 10/2006 | Monroe ....................... 725/105 |
| 7,302,481 | B1 | * | 11/2007 | Wilson ........................ 709/224 |
| 2003/0204370 | A1 | | 10/2003 | Yemini et al. |

OTHER PUBLICATIONS

Gray M D et al: "Realtime Data Analysis for the Joint Theater Missile Defense Simulation Network (JTMDSN)" AI, Simulation and Planning in High Autonomy Systems, 1994. Distributed Interactive Simulation Environments., Proceedings of the Fifth Annual Conference on Gainesville, FL USA Dec. 7-9, 1994, Los Alamitos, CA, USA, IEEE Comput. Soc, Dec. 7, 1994, pp. 77-81, XP010134413, ISBN: 0-8186-6440-1.
International Search Report for corresponding EP 05 25 3151, completed Nov. 14, 2005 by Examiner R. Niemeijer at The Hague.

* cited by examiner

*Primary Examiner*—Kanji Patel
(74) *Attorney, Agent, or Firm*—Tarolli, Sundheim, Covell & Tummino LLP (57) ABSTRACT

Systems and methods are provided for filtering detected events to determine events of interest. A sensor data analysis system identifies a plurality of detected events from provided sensor data and evaluates the sensor data to determine at least one characteristic associated with each event. The sensor data analysis system reports the plurality of detected events and their associated characteristics. At least one affiliated event generator is operative to generate at least one affiliated event and produce at least one event report. A given event report provides at least one characteristic associated with an affiliated event. An event filtering system compares the at least one event report to the detected events to identify at least one affiliated event amongst the plurality of detected events.

20 Claims, 5 Drawing Sheets

EVENT CAPTURE AND FILTERING SYSTEM

TECHNICAL FIELD

The present invention relates generally to information systems, and more particularly to an event capture and filtering system.

BACKGROUND OF THE INVENTION

Advances in sensor technology have made it possible for sensors to provide significant amounts of information concerning an area of interest. For example, wide-range sensors can be mounted to high-altitude aircraft or orbital satellites to provide a comprehensive view of the area. These sensors can provide continuous monitoring of events occurring within the area of interest, but generally, view so many events that it is not always easy to discern which events are of interest, or easily identify events caused by affiliated sources. In some applications, mobile short-range sensors, focused area sensors, or human investigators can be made available for further investigation of a given event, but the sheer number of events generally detected within a given area can make it difficult to allocate these resources effectively, or to provide adequate discernment thereby.

Under the prior state of the art, extraction of useful decision making information from the sensor data can be a difficult process. The various sensors work independently of other available information, making it difficult to distinguish (without significant human intervention) interesting events from events already known by decision makers. This intervention adds to the expense of collecting data, introduces the possibility of human error, and, most importantly, significantly delays the interpretation and enhancement of the collected data. Since the cause of an event may not be apparent even shortly after the occurrence of the event, it is important to quickly and decisively appreciate the importance of an event, and gather desired information while the information is available.

When dealing with these situations in the past, it has been the duty of human operators to determine meaning from provided sensor data. The sensor readings are analyzed by a staff of individuals in light of available knowledge of the area of interest, and sensor resources are allocated to further investigate events on an ad hoc basis. Amongst other problems, the decision-making staff is faced with the problem of optimizing the allocation of sensor resources to interesting events. The number of events occurring within an area of interest at any given time generally exceeds the available sensor resources, such that a desirable level of sensor resources can generally not be brought to bear on every detected event. As the number of sensor systems and detected events increase, such determinations become increasingly difficult.

SUMMARY OF THE INVENTION

The present invention relates to systems and methods for filtering detected events to determine events of interest. In accordance with one aspect of the present invention, an event capture and filtering system is provided. A sensor data analysis system identifies a plurality of detected events from provided sensor data, and evaluates the sensor data to determine at least one characteristic associated with each event. The sensor data analysis system reports the plurality of detected events and their associated characteristics. At least one affiliated event generator is operative to generate at least one affiliated event, and produce at least one event report. A given event report provides at least one characteristic associated with an affiliated event. An event filtering system compares the at least one event report to the detected events to identify at least one affiliated event amongst the plurality of detected events.

In accordance with another aspect of the invention, a method of identifying events of interest within a defined area is provided. Raw sensor data representing a plurality of detected events in the defined area is collected. The collected data are analyzed to determine at least one associated characteristic for each detected event. At least one event report is generated representing respective events affiliated with the system. A given event report includes at least one associated characteristic of an event affiliated with the system. The generated at least one event report is matched to the detected events to determine which of the detected events are affiliated with the system. The detected events are filtered to remove the events affiliated with the system, so as to identify at least one event of interest. This aspect of the invention assumes that the events not affiliated with the system are of primary interest, and are the best candidates for further evaluation and identification.

DETAILED DESCRIPTION OF INVENTION

The present invention relates to systems and methods for filtering detected events to determine one or more events of interest. A surveillance system can include one or more sensors that monitor an area of interest to detect the occurrence of events. The sensor data relating to these detected events can be interpreted to narrow the list of events and to provide data concerning various characteristics of the detected events. Concurrently, event generators affiliated with the system can report to the other components of the system to other components of the system the generation of events that are expected to be discernable by one or more of the sensors. For example, a weapon under our own control might fire; an event generator integrated into that weapon would report that event to the event filtering system. If a sensor detects this particular weapon firing, by association (which can be performed automatically by a computer) of the weapon firing event (reported by the event generator) with the sensor detection in time, space, and signature, an indicative or definitive interpretation of the sensed phenomena can be made available in near-real-time to all associated decision makers, and this sensed event can be described as a firing of one of our own weapons. The reports of affiliated/generation events can be provided to other event generators, to a central control area (such as a command station), and an event filtering system. These event reports can include a number of characteristics associated with the event. The event filtering system can compare the characteristics of the affiliated events to the characteristics of all of the detected events to determine which of the detected events are affiliated with the system, and which are unaffiliated with the system. Using this information, sensor resources, and/or human resources can be assigned to investigate the unaffiliated events, without wasting resources on events initiated by units affiliated with the system.

Figure 1:
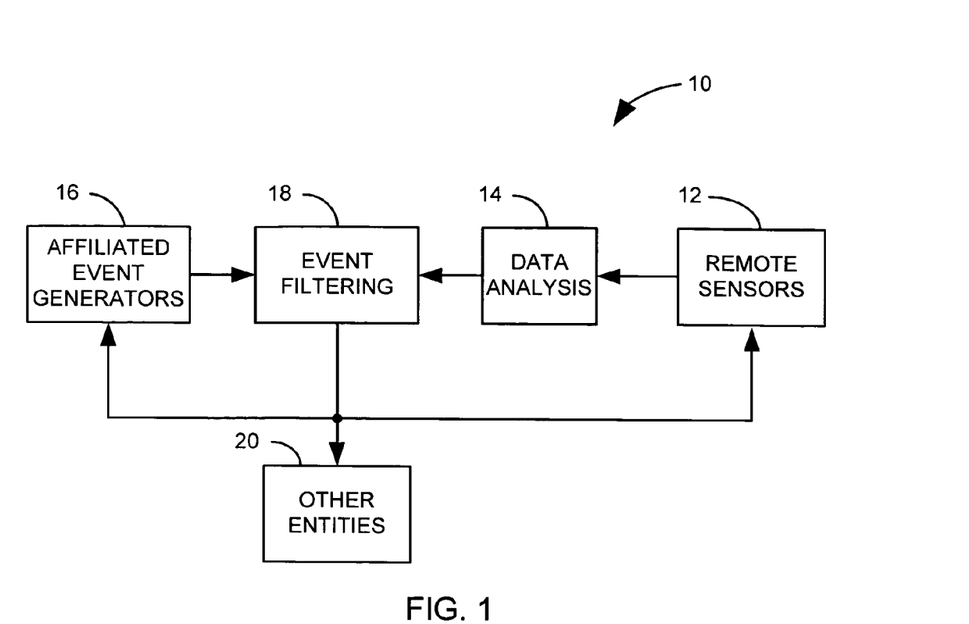
FIG. 1 illustrates a functional block diagram of an event capture system in accordance with an aspect of the present invention.

FIG. 1 illustrates an event capture system 10 in accordance with one aspect of the present invention. The system 10 includes one or more remote sensor systems 12 that sense and record data associated with a monitored area. For example, the sensor systems 12 can periodically provide a map showing the intensity of a sensed attribute at various geographical locations within the monitored area. The remote sensor systems 12 can employ one or more of a variety of phenomenological methods to gather raw data, such as imaging in the visible, infrared, or other spectrum, non-imaging sensors collecting infrared (IR), radio frequency (RF), or other spectrum data, moving target indicator (MTI) radar, synthetic aperture radar, passive radio frequency emission monitoring (e.g., signals intelligence, etc.), acoustic sensing, or similar methods. The sensor systems 12 can be stationary, or can be mounted on mobile platforms, such as ground vehicles, aircraft, and spacecraft.

The raw data collected by the sensors is provided to a data analysis system 14 associated with the sensors. The data analysis system 14 can review raw data provided over time from the sensors to identify events within the monitored area. An event is an occurrence within a defined class of occurrences of interest that provides a detectable observable at an associated one of the one or more sensors. For example, an event can be an occurrence meeting one or more of a threshold duration, intensity, and geographical area. From the sensor data, the data analysis system 14 can record a geographic location and time period associated with a detected event, along with any other available observables and information of interest. In an exemplary implementation, the data analysis system 14 can contain one or more expert systems that identify known event types from the sensor data. For example, the data analysis system 14 can extract an event signature from multiple frames of sensor data representing a period of time and compare it to known classes of events associated with the sensor.

The system 10 also receives input from a plurality of affiliated event generators 16. Affiliated event generators 16 are devices or personnel associated with the system 10 that can operate to generate discernable event data at the remote sensors 12. Often, the events generated by the affiliated event generators 16 produce sensor readings that can be difficult or impossible to distinguish from events external to the system 10. When an event generator operates in a manner expected to produce a detectable event, an event report can be generated, detailing the time, geographic location, and type of event generated. These event reports can be provided by an operator or generated automatically by a device producing the associated event or by a device directly associated with the active element generating the associated event. The event reports can be communicated amongst the affiliated event generators 16 to notify operators, if any, of the occurrence of an affiliated event.

The event reports are also provided to an event filtering system 18. The event filtering system 18 also receives the sensor event data from the data analysis system 14. The event filtering system 18 matches the event information from the data analysis system 14 to event data provided from the affiliated event generators 16 to filter the affiliated events from the detected events and identify any events within the sensor data that are not affiliated with the system 10. The event filtering system 18 matches an affiliated event to its associated sensor data by comparing the event characteristics recorded in the event report, such as the time, location, specific observables, and type of event to the corresponding data gathered by the sensors 12. This can be accomplished, for example, with one or more expert systems or via a statistical correlation process. Any unmatched events from the sensor system 12 are presumed to unaffiliated with the system 10 and can be compiled into a list of events of interest for further investigation. This filtered list of events can then be provided to one or more of the sensor systems 12, the affiliated event generators 16, or other entities affiliated with the system 20. For example, the filtered list of events can be provided to a sensor control (not shown) that allocates sensor resources or human resources to further investigate the unaffiliated events.

Figure 2:
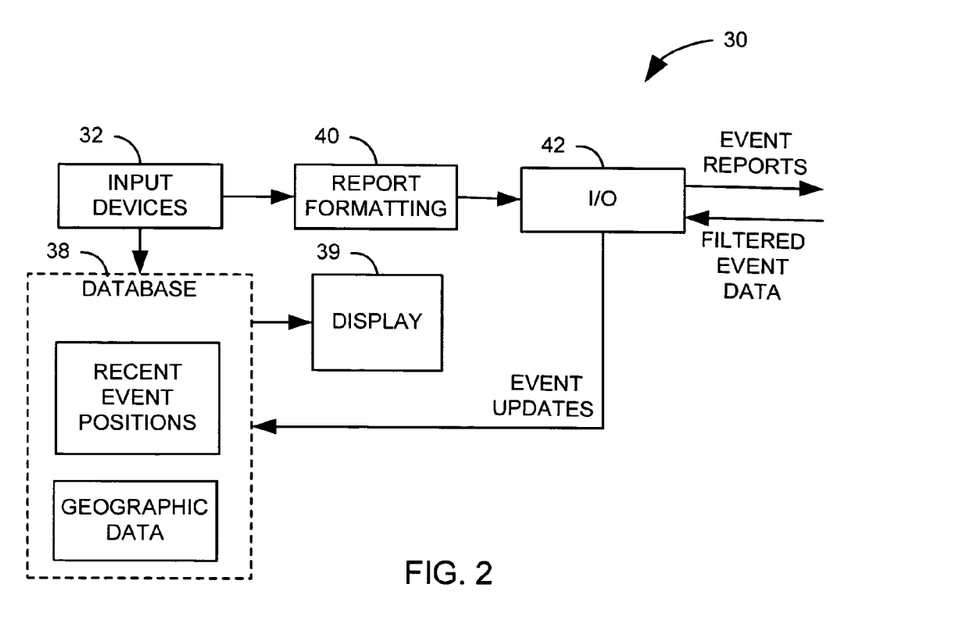
FIG. 2 illustrates a functional block diagram of an exemplary affiliated device that provides reports of its generated events in accordance with an aspect of the present invention.

FIG. 2 illustrates a functional block diagram of an exemplary affiliated device 30 that provides reports of its generated events in accordance with an aspect of the present invention. In conjunction with operating as to produce a sensor visible event, the affiliated device 30 gathers event information for an event report through one or more input devices 32 and generates an event report. It will be appreciated that the event report can be generated concurrently, after, or in anticipation of the event. For example, the input devices 32 can comprise a computer keyboard or touchscreen on which a trained operator enters characteristics of the event, such as its associated starting time, location, duration, and type. The input devices 32 can also comprise an automated system within the affiliated device 30 that can record the occurrence of an event associated with the device. For example, time and location data from a Global Positioning System (GPS) within the device upon initiation of the event.

The data from the one or more input devices 32 are provided to a database 38. The database 38 contains information on previously recorded events, geographic information concerning the area of interest, and other relevant information for interpreting event data. In a military application, for example, the other relevant information can include locations of friendly and hostile forces, summaries of known enemy intent, instructions from a theater command, and similar information. Information from the database can be displayed at a display 39 operatively connected to the database. The display 39 can be a touchscreen display, or an alternate device (not shown) for displaying or accessing the information. For example, reported events can be shown on the display 39 along with their associated characteristics. The database is periodically updated through transmissions received at an input/output device 42.

The data from the one or more input devices are also provided to a report formatter 40. The report formatter 40 collects the input data into a format compatible with other components of the event capture system, and assigns it a unique report ID to form an event report. The unique ID is also stored in the local database 38. The event report is provided to the transceiver 42, and broadcast to the event filtering system. In an exemplary implementation, the event report further comprises multicast updates to one or more other components of the event capture system (e.g., other event generators, and other system entities).

Figure 3:
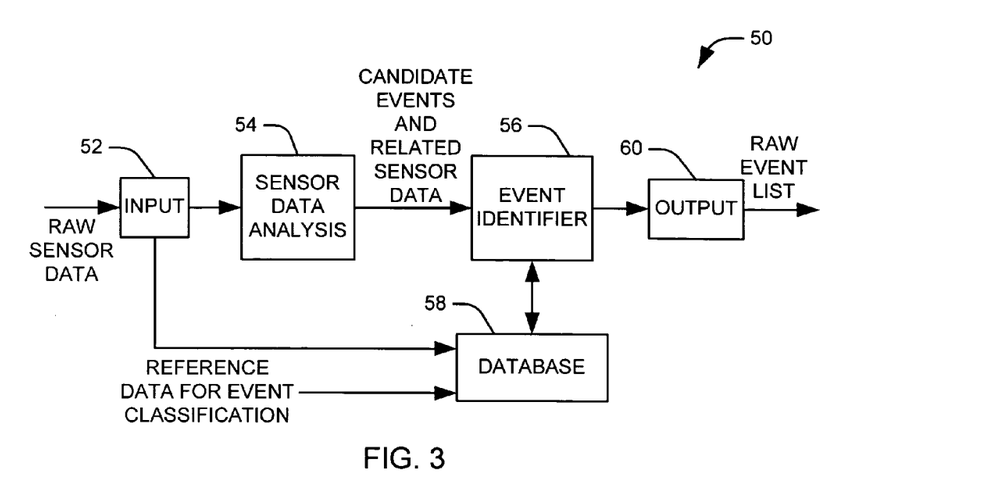
FIG. 3 illustrates a functional block diagram of an exemplary sensor data analysis system in accordance with an aspect of the present invention.

FIG. 3 illustrates a functional block diagram of an exemplary sensor data analysis system 50 in accordance with an aspect of the present invention. The data analysis system 50 receives a raw data from one or more sensors at an input device 52. The one or more sensors can include any of a variety of sensor types, including long range cameras for imaging in the visible, infrared, ultraviolet and RF spectrums, or non-imaging sensors in the visible, infrared, ultraviolet or RF spectrums, acoustic sensors, various radio wave detectors, and similar devices. In the illustrated example, the data from each sensor can be presented as a series of two-dimensional image frames, representing a period of time, in which each pixel within a given image frame represents the intensity of the imaged medium (e.g., infrared radiation) at a corresponding geographic location. The image frames are taken at regular intervals by the sensors, such that each frame within the series represents a specific point in time within the represented time period.

The sensor data is provided to a sensor data analysis device 54. The sensor data analysis device 54 evaluates the series of sensor data frames to determine portions that might represent events within the range of the sensor. For example, candidate events can be selected by locating a group of one or more adjacent pixels having an intensity value higher than a threshold value. The sensor data analysis device 54 can also characterize the observed events (e.g. intensity, intensity vs. time, related platform characteristics, etc.) to produce additional identifying characteristics of the event. Each candidate event will have certain identifying information assigned to it during the candidate selection process. The information can include one or more of an associated starting time, duration, geographic location(s) or area, and a unique identification number.

The candidate events from the sensor data analysis device 54 are provided to an event identifier 56 that analyzes the candidate events to determine which represent actual events within the imaged area and which represent false events, such as sensor artifacts and other readings not of interest. Along with the identifying information discussed above, the sensor data analysis device 54 can also provide additional sensor data associated with the candidate events to facilitate the identification process. The event identifier 56 can utilize one or more expert systems to identify actual events and common false events to generate a raw (e.g., unfiltered) event list. In an exemplary embodiment, the event identifier 56 can include a pattern recognition classifier that attempts to classify the candidate event into one of a plurality of known event classes or an unknown event class. The class designation for each event can be provided with the raw event list along with the assigned information for each event.

Figure 4:
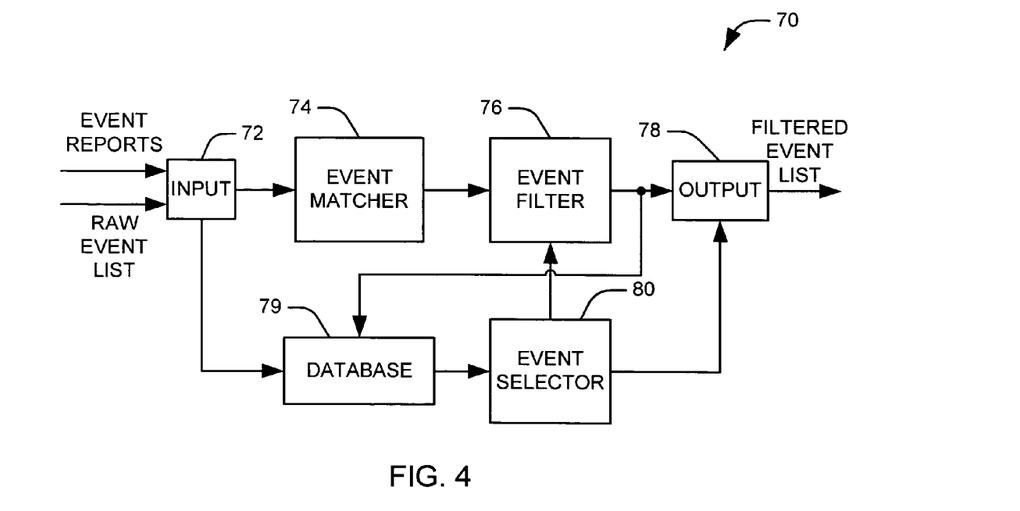
FIG. 4 illustrates a functional block diagram of an exemplary event filtering system 70 in accordance with an aspect of the present invention.

The event identifier 56 can utilize information from an associated database 58 in determining if a candidate event represents an actual event. The database 58 contains information on previously recorded events, geographic information concerning the area of interest, and other relevant information for interpreting event data. In a military application, for example, the other relevant information can include known locations of friendly and hostile forces, summaries of known enemy intent, instructions from a theater command, and similar information. For example, the event identifier 56 can also attempt to assign one or a plurality of general events classes to the event. For example, using the reference data in database 58 on intensity vs time profiles for various general types of events, the event identifier 58 may attempt to sort IR detection events into muzzle flashes, rocket launches and explosions. The database is periodically updated through transmissions received at the receiver 52. After the events are identified, they are provided to an output device 60 for transmission to an event filtering system as a raw list of detected events FIG. 4 illustrates a functional block diagram of an exemplary event filtering system 70 in accordance with an aspect of the present invention. The event filtering system 70 receives the raw event list and one or more event reports from affiliated systems at an input device 72. The received information is provided to an event matcher 74 that determines which of the detected events have been generated by units affiliated with the system. The event matcher 74 can include one or more expert systems or statistical or fuzzy analysis routines for relating an event report to a matching event. For example, the event matcher 74 can perform a statistical correlation routine that matches the event reports with detected events according to their associated characteristics, such as starting time, duration, geographical location, other event observables and event type. Alternatively, the associated characteristics of a given detected event and a related event report can be provided as inputs to a pattern recognition classifier, such as a support vector machine, that determines whether the characteristics are sufficient similar as to indicate a match and generates a confidence value for the determination.

An event filter 76 compares the raw event list to the determined affiliated events to generate a filtered event list consisting solely of unaffiliated events. Since the cause of each affiliated event has been provided via the provided event reports, no further investigation of these events is necessary, and they are omitted from the filtered list. The filtered event list is then provided to an output device 78 to be provided to one or more affiliated units of the system. For example, the filtered event list can be provided to a sensor control to allow for a more efficient allocation of sensor resources. Using the filtered list, sensor resources that might otherwise be expended investigating events initiated by affiliated devices and personnel can be allocated instead to unexplained events identified by the filtered event list. The filtered event list can also be provided as an update to an associated database 79.

In an exemplary embodiment, an event selector 80 can review the filtered event list to determine unaffiliated events of particular interest. The event selector 80 can include automated systems and/or human operators that select events having characteristics indicating that further investigation of the event may be desirable. The event selector 80 can utilize information from the associated database 79 in determining if an identified unaffiliated event may be of particular interest. The database 79 contains information substantially identical to the databases associated with the event generator illustrated in FIG. 2 and the sensor data analysis system illustrated in FIG. 3. In a military application, for example, the known locations of friendly and hostile forces and planned movements of friendly units can be used to determine events of particular interest, as unknown events close to friendly units or their planned routes are of particular importance. Other examples of selection criteria for a given application will be apparent to one skilled in the art. The database can be periodically updated through transmissions received at the input device 72. After the events of interest are selected, they can be provided to an output device 78 for transmission to the sensor control to further guide the allocation of sensor resources.

Figure 5:
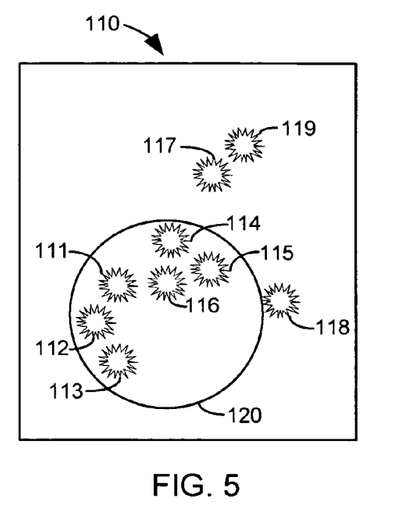
FIG. 5 illustrates a map of an area of interest depicting the response of an exemplary event capture system in accordance with an aspect of the present invention at a first time.
Figure 6:
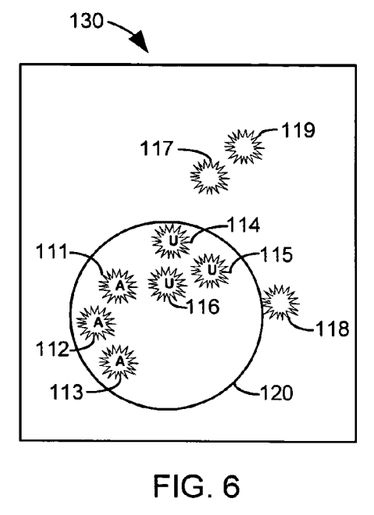
FIG. 6 illustrates a map of an area of interest depicting the response of an exemplary event capture system in accordance with an aspect of the present invention at a second time.
Figure 7:
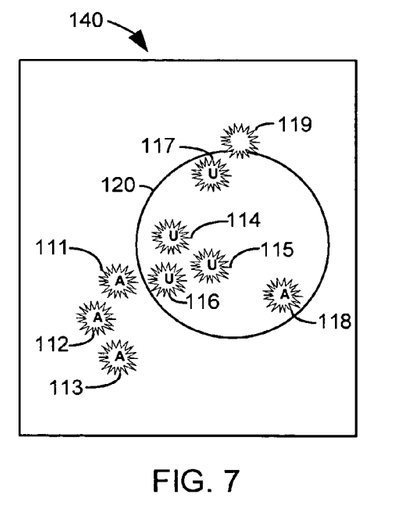
FIG. 7 illustrates a map of an area of interest depicting the response of an exemplary event capture system in accordance with an aspect of the present invention at a third time.
Figure 8:
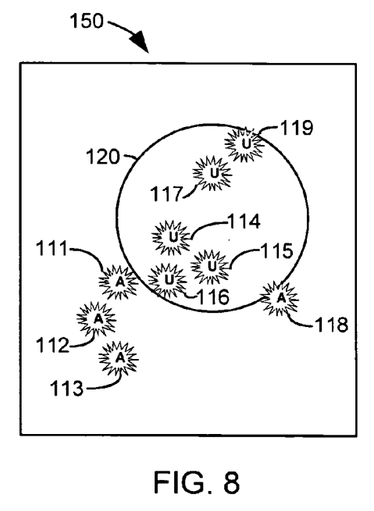
FIG. 8 illustrates a map of an area of interest depicting the response of an exemplary event capture system in accordance with an aspect of the present invention at a fourth time.

FIGS. 5-8 depict a plurality of maps representing an area of interest at various points in a progression of time to demonstrate the response of an exemplary sensor control system to data provided by an event capture system in accordance with an exemplary implementation of the present invention. It will be appreciated that FIGS. 5-8 are provided solely for the purposes of explanation and example, and that they represent an extreme simplification of the event capture process and an associated sensor system. FIGS. 5-8 represent a sequential progression through time, with FIG. 5 representing a first state of the area of interest and FIG. 8 representing a last state of the area of interest.

FIG. 5 illustrates a map 110 of the area of interest at a first time depicting plurality of events 111-119 occurring within the area of interest. At the time represented by FIG. 5, six of the events 111-116 are within a scanning range 120 associated with the sensor and can be detected by the sensor. As discussed previously, it can be difficult to determine the origin of a given event from sensor data, so each of the events 111-116 are considered to be of an unknown origin at the time represented by FIG. 5. The sensor data can be provided to an event filtering system, either at the sensor control or at a remote location.

FIG. 6 illustrates a map 130 of the area of interest at a second time, when data concerning affiliated events (e.g., 111-113) has been provided to the sensor control system. For example, an event filtering system associated with the sensor control could have provided information concerning designating the various detected events as affiliated with the sensor system or unaffiliated with the sensor system. For the purpose of example, it is assumed that three of the events 111-113 are determined to be affiliated with the sensor system, while three of the events 114-116 are determined to be unaffiliated.

FIG. 7 illustrates a map 140 of the area of interest at a third time, when the sensor control system has allocated sensor resources according to the position of the unaffiliated events. The scanning range 120 of the sensor has been adjusted to focus on the unaffiliated events 114-116 and the surrounding area, ignoring the known affiliated events 111-113. It will be appreciated that other responses to the determined unaffiliated events 114-116 are available in addition to adjusting the scanning range of a detecting sensor. For example, other scanners, with better resolution and a smaller scanning area, or human investigators can be assigned to investigate the unaffiliated events. As a result of the shift in the scanning range 120 of the sensor system, two more events 117 and 118 are detected by the sensor. These detected events can be provided to the event filtering system, which responds with information as to which of the detected events are affiliated with the sensor system. Using provided affiliated event information, one of the events 118 is designated as affiliated with the sensor system and one of the events 117 is designated as unaffiliated.

FIG. 8 illustrates a map 150 of the area of interest at a fourth time, when the sensor control system has once again allocated sensor resources according to the position of the unaffiliated events. The scanning range 120 of the sensor has been adjusted to focus on the unaffiliated events 114-117 and the surrounding area, ignoring the known affiliated events 111-113 and 118. As a result of the shift in the scanning range, another event 119 is located by the sensor. The newly detected event can be analyzed at an event filtering system, which determines that it is unaffiliated with the system and returns this information to the sensor control. The sensor control can maintain the scanning range 120 at the illustrated position until one or more additional unaffiliated events are detected, making the reallocation of the available sensor resources desirable.

Figure 9:
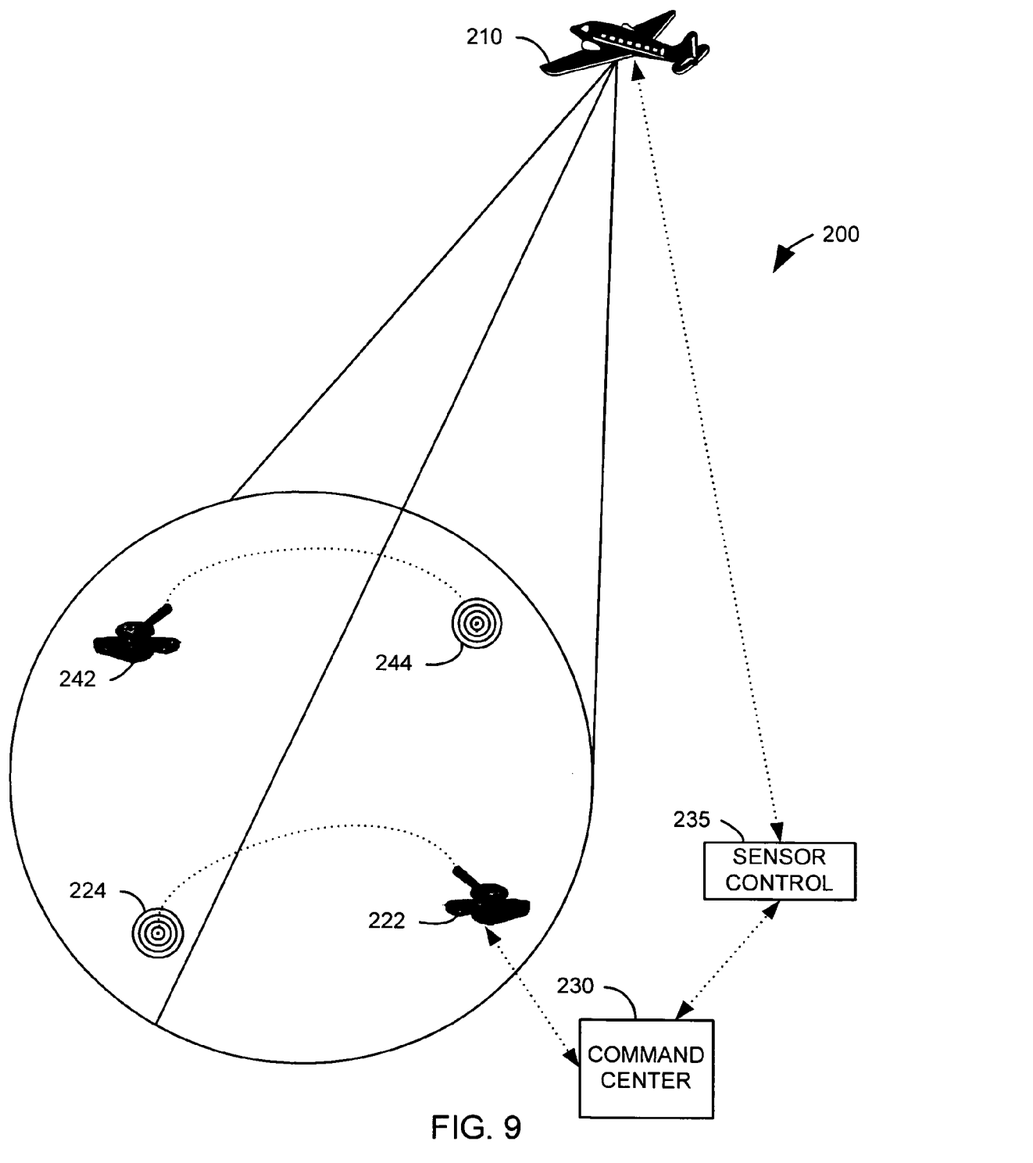
FIG. 9 illustrates an exemplary event capture system in accordance with an aspect of the present invention.

FIG. 9 illustrates an exemplary event capture system 200 in accordance with one aspect of the present invention. The system 200 is illustrated as part of a battlefield communications system in a military theater of operations, with at least one theater sensor 210 providing infrared imaging of an area of interest. It will be appreciated that the event capture system of the present invention is not limited to military applications, and may be used, for example, in civilian search and rescue operations, domestic security applications, and telecommunications systems.

Although the illustrated example is restricted to a single sensor system for the purpose of discussion, it will be appreciated that multiple remote sensor systems of varying types can be used within the event capture system of the present invention. For example, multiple sensors can be utilized representing a variety of phenomenological methods to gather data, such as imaging in the visible, infrared, or other spectrum, non-imaging sensors in the visible, infrared, RF or other spectrum, moving target indicator (MTI) radar, synthetic aperture radar, passive radio frequency emission monitoring (e.g., signals intelligence), acoustic sensing, or similar methodologies. The remote sensors can also vary in their method of deployment.

In an exemplary application, three basic deployment platforms for remote sensor systems are available. Long-range remote sensor systems, such as those deployed on spacecraft, are located at a relatively high altitude above an area of interest. These devices have a relatively large tracking range, but generally cannot provide a high degree of resolution, at least as compared to other sensor platforms. Intermediate remote sensor systems are located at an intermediate altitude above the area of interest. These devices have a smaller range than the first type, but generally cover a smaller overall area at higher resolution. Current examples of intermediate remote sensor systems include the JSTAR systems, an airborne radar system manufactured by Northrop Grumman Corporation, and GuardRail, an airborne signals intelligence system, also manufactured by Northrop Grumman Corporation. Many other examples exist now, and are planned for the future. In the illustrated example, the remote sensor 210 is part of an intermediate-range remote sensor system. Finally, short-range remote sensor systems are located at ground level, or a relatively short distance above ground level. These remote sensor systems have the shortest range of all, but can have superior resolution. Example short-range remote sensor/tracking systems include unmanned aircraft, such as the Hunter UAV manufactured by Northrop Grumman Corporation, and ground based reconnaissance units. Other short-range sensors might include devices such as unattended ground sensors, which are stationary, but obtain area coverage through the use of a large number of such dispersed units.

The event capture system 20 includes an affiliated event generator 222 in the form of a friendly tank firing an artillery round at a remote target 224. Both the initial launch of the artillery shell and its eventual detonation will be detected as events during an infrared scan at the remote sensor 210. The affiliated event generator 222 prepares an event report detailing the two events, including the position of the tank upon firing, the time of firing, the type of round fired, the location of the target 224, the event types (e.g., artillery fire and impact), and an expected or observed time of arrival of the round at the target. The provided target location can be an estimate of the position of the target 224, or can reflect targeting data provided to automated systems within the affiliated event generator 222. In an exemplary implementation, the entire report can be generated via an automated system within the affiliated event generator 222 through reference to an associated global positioning system (GPS) that gives its present location and a targeting system that gives the location of the target relative to the position of the event generator.

The affiliated event generator 222 can include a database containing geographic data and known positions of friendly forces, events, and enemy forces as part of a FBCB2 (Force 21 Battle Command, Brigade-and-Below), or a similar successor situational-awareness/battlefield automation and communications system. The event report is assigned a unique identification number, and is formatted to be compatible with the connected database. The information from the event report is added to the database, and multicast as a radio signal by a transceiver associated with the affiliated event generator 222. The event information, including the determined characteristics of the event, such as starting time, duration, and its associated event type, can be accessed at a display associated with the database.

The event report is received by other units in the area of interest (not shown). These other units each possess a database roughly identical to that of the affiliated event generator 222. Upon receiving the event report, a unit controller (e.g., a microprocessor) at each unit updates the database to record the position, time, duration, and nature of the new events. The event report is then re-broadcast to other units, effectively spreading the event report to friendly units across the area of interest and beyond. By use of these multicasts, the database at each unit is kept roughly identical to maintain a system of common databases across the theater of operations. These common databases will be found with each combat and support unit, as well as in a command center 230 (e.g., a theater command center or a national command center), and all friendly units within or near the area of interest (not shown). Thus, each unit will have information concerning each affiliated event filed in its computer and database under the appropriate and identical unique identification key, allowing them to communicate efficiently about any particular event.

The event report is eventually received at a command center 230, or a similar command post. The command center 230 is the main command area within the area of operations. The command center 230 will contain a database roughly identical to that of the battlefield units. The database is updated automatically in real-time (as are each of the databases across the entire theater area of operations) to reflect each new event report. The command center will receive a number of individual event reports over a period of time, each with a unique identification tag.

In the illustrated implementation, the remote sensor 210 periodically monitors the area of interest to provide a series of infrared images of the area. Each image within the series represents the area at a given point in time. These images are provided to a sensor control 235 for analysis. The ground station 235 provides a control component for the remote sensor 210 and houses a data analysis system for interpreting the sensor output. The data analysis system identifies one or more potential events in the series of infrared images according to an associated pattern segmentation routine. For example, the segmentation routine can search the series of images for intensity values associated with an area that exceed a first threshold value or remain above a second threshold value for a period of time. A candidate event profile can be established around each high intensity region. More complex segmentation routines can be implemented, using the duration, intensity, and gradient of the intensity (e.g., rate of increase/decrease in intensity) within the images to establish a suitable candidate event profile.

The candidate event profiles are then provided to one or more expert systems that attempt to distinguish between actual events and false events, such as sensor artifacts and known infrared signatures that are not of interest. The expert systems can include, for example, rule-based systems, case-based reasoning systems, and pattern recognition classifiers, such as neural network classifiers, support vector machines, statistical correlators, fuzzy logic correlators and similar systems. The size, duration, and location of the event can be evaluated at these experts to determine if it represents an actual event. In an exemplary embodiment, the one or more expert systems can include a pattern recognition classifier that attempts to determine an associated nature of the event. The duration, area, and shape of the candidate event profile can be compared to known event profiles to select one or more possible classes for the event. For example, the classes can correspond to classes for launches and impacts of various types of artillery and missiles, large fires (e.g., forest fires and oil well fires), and similar common battlefield events that produce significant infrared radiation. The event can be assigned to any of a number of such classes or to an unknown class if the event profile does not match a known event class.

In the illustrated example, the remote sensor 210 would detect four events, the firing of the artillery shell from the affiliated event generator 222, the impact of the artillery shell at the target 224, an artillery launch from a hostile event generator 242, and the impact of the shell at a hostile impact site 244. Each of these events is recorded from the remote sensor 210 and identified as possible artillery related events at the ground station 235. The determined events are passed to an event filtering system, located in the illustrated example at the command center 230. It will be appreciated, however, that the event filtering system can be physically packaged in a variety of ways: as a separate system at a separate location (e.g., at a national command or intelligence center (not shown)), as a separate system that is co-located with a tactical Intelligence, Surveillance and Reconnaissance (ISR) node, or a Command and Control (C2) node such as GCCS, JC2, FBCB2-or-similar-or-successor system, or as a software function that is embedded within the ISR or C2 (e.g. FBCB2)-or-similar-or-successor systems. It is to be appreciated that other elements of the present invention (e.g., the data analysis system) can also be packaged in a variety of different ways and at various locations.

The event filtering system compares the determined events from the remote sensor 210 with the event reports from the affiliated event generator 222. This can be accomplished via an expert system or a statistical correlation analysis that matches the time, duration, location, and event type from the event reports to the data provided from the remote sensor 210. In the illustrated example, the event filtering system compares event reports with determined events that are within a threshold distance in starting time, duration, and geographic distance. Matches are determined according to a correlation formula that determines a similarity value from calculated differences in the starting time of the event, the duration of the event, and the geographic location, each weighted by a set of predetermined coefficients. A constant value can be included in the formula reflecting a match between the recorded event type and the event type determined at the data analysis system. In an exemplary implementation, events that cannot be matched with affiliated event reports can be reported as locations of possible hostile forces and the events as possible hostile activities.

The filtered event reports can be provided (e.g., via multicast) to various friendly units in the area of interest as an update to their associated databases. The event reports can also be provided back to the sensor control 235 to allow any available sensor resources to be assigned to unknown events. In an exemplary implementation, the filtered event report can be analyzed by a selection system within the command center to determine if any of the unknown targets are of particular interest. The location reports are preprocessed to aid in selecting individual events of interest. The selection of individual events of interest can be fully automated or fully manual, but will generally involve a division of functions between one or more human operators and a data processing system. Thus, the processing of the location reports can include one or more of formatting the data for display to a human operator, eliminating obviously uninteresting targets based upon predefined parameters (e.g., the distance of the event from friendly forces, non-threatening event classes), and translating the information provided in the location report to a series of numerical parameters for use in an expert system. The determined events of interest can be provided to the sensor control 235 to allocate available sensor resources to the events of interest.

Figure 10:
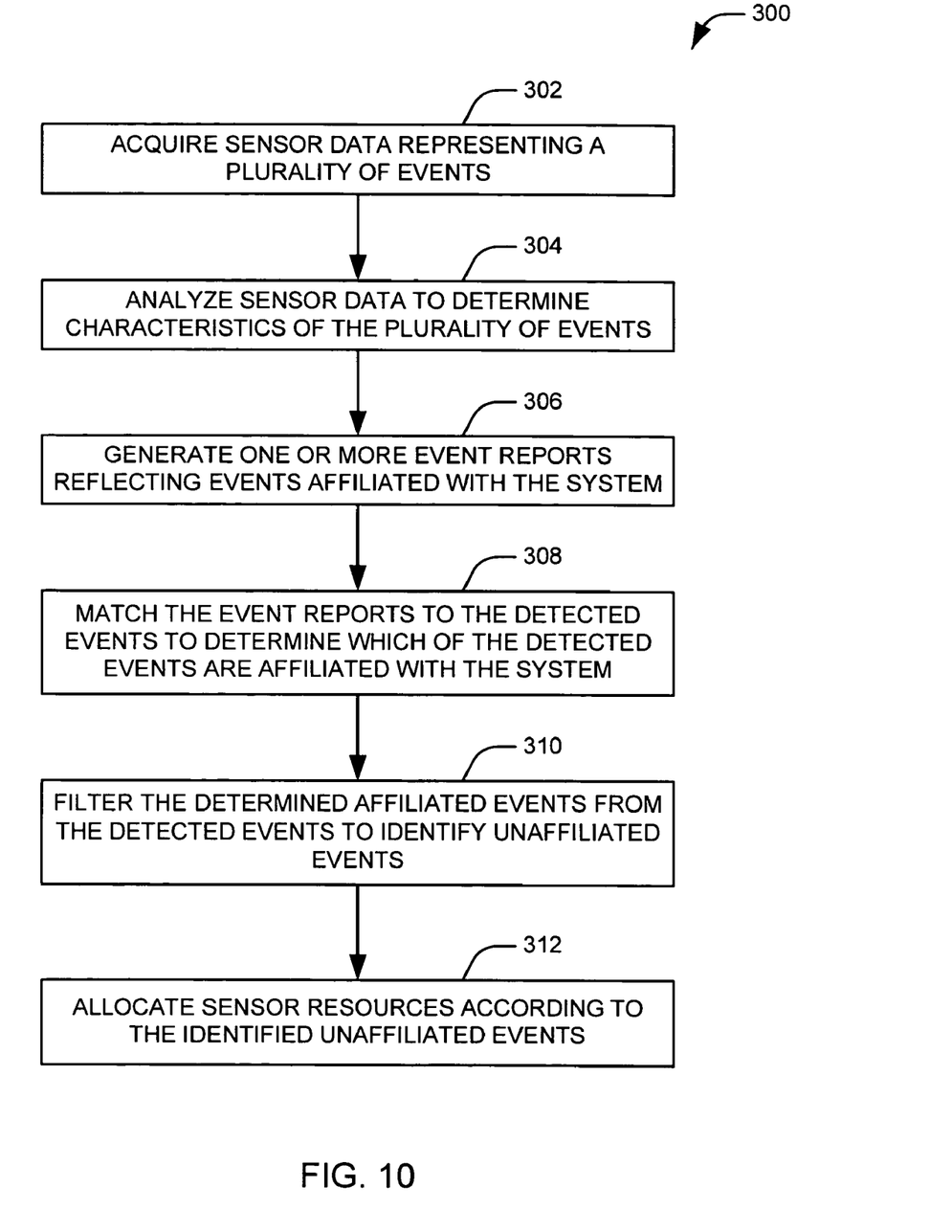
FIG. 10 illustrates an exemplary methodology for event capturing and filtering in accordance with an aspect of the present invention.

In view of the foregoing structural and functional features described above, methodologies in accordance with various aspects of the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates an exemplary methodology 300 for event capturing and filtering in accordance with the present invention. The methodology 300 begins at 302, where raw sensor data representing a plurality of events is detected. The sensor data can be produced according to one or more of a variety of known sensing methodologies. At 304, the raw sensor data is analyzed to determine one or more characteristics of the detected events. For example, a starting time, duration, and geographic location can be determined for each event. It will be appreciated that the sensor data can be interpreted by one or more automated expert systems or by a human operator.

At 306, one or more event reports are generated reflecting events affiliated with the system. The affiliated events can reflect any phenomena detectable by the system that is brought about by the actions of a device or operator affiliated with the system. The event reports contain characteristics of the generated event corresponding to those determined for the detected events (e.g., the starting time, duration, and geographic location of each affiliated event). At 308, the event reports are matched to the detected events to determine which of the detected events were affiliated events generated by devices or operators affiliated with the system. The events can be matched according to their associated characteristics. The matching can be accomplished, for example, according to a statistical correlation of the provided data, a pairing of events under a threshold distance in a feature space defined by their associated characteristics, or any of a variety of suitable automated intelligent analysis processes.

At 310, the detected events are filtered to remove any affiliated events, leaving a list of events unaffiliated with the system. The unaffiliated events represent the events that the system cannot account for from the activity of associated devices and operators. At 312, sensor resources associated with the system are allocated according to the recorded locations of the unaffiliated events. This allows the system to concentrate its sensor resources on events of which it has little or no knowledge while ignoring events that are generated by the activity of affiliated actors. The methodology then terminates.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, an unaffiliated event can be correlated with the termination of the output from an affiliated device. This may indicate that a hostile event has damaged the device or the platform that contained the device. Accordingly, the present invention is intended to embrace all such alterations, modifications, and variations that fall within the spirit and scope of the appended claims.

What is claimed is:

1. An event capture and filtering system comprising:
a sensor data analysis system that identifies a plurality of detected events from provided sensor data, evaluates the sensor data to determine at least one characteristic associated with each event, and reports the plurality of detected events and their associated characteristics;
at least one affiliated event generator operative to generate at least one affiliated event and produce at least one event report, a given event report including at least one characteristic associated with an affiliated event;
an event filtering system that compares the at least one event report to the plurality of detected events to identify at least one affiliated event amongst the plurality of detected events and determines at least one unaffiliated event by filtering the identified affiliated events from the plurality of detected events; and
a sensor control that allocates available sensor resources according to the associated characteristics of the determined at least one unaffiliated event.

2. The system of claim 1, the event filtering system reporting the at least one unaffiliated event to a plurality of common databases, at least one database being located at the sensor control.

3. The system of claim 2, the at least one affiliated event generator having respective associated databases from the plurality of common databases.

4. The system of claim 2, further comprising a display coupled to at least one of the plurality of common databases, the display providing a graphical representation of the at least one unaffiliated event and respective determined characteristics of the at least one unaffiliated event.

5. The system of claim 1, the at least one characteristic determined at the sensor data analysis system comprising at least one of a geographic location associated with a detected event, a starting time associated with a detected event, and a duration associated with a detected event.

6. The system of claim 1, the sensor data analysis system comprising a pattern recognition classifier that determines an event class associated with a given event.

7. The system of claim 1, the at least one affiliated event generator comprising an output device that transmits the at least one event report as a radio frequency broadcast such that it is received by the event filtering system and by at least one other entity affiliated with the system.

8. The system of claim 1, the event filtering system comprising an intelligent decision making system that compares the provided at least one characteristic associated with a given affiliated event to at least one corresponding characteristic of at least one of the plurality of detected events.

9. The system of claim 8, the intelligent decision making system performing a correlation analysis of the provided at least one characteristic associated with the affiliated event relative to at least one corresponding characteristic of at least one of the plurality of detected events.

10. The system of claim 8, the event filtering system comprising a pattern recognition classifier.

11. A battlefield communication system comprising the system of claim 1.

12. An event capture and filtering system comprising:
    means for recording events affiliated with the system within an area of interest;
    means for detecting events within the area of interest;
    means for filtering the affiliated events from the detected events to determine at least one unaffiliated event; and
    means for allocating sensor resources based on the at least one unaffiliated event.

13. The system of claim 12, further comprising means for determining associated characteristics of the detected events, the means for filtering comprising means for evaluating the detected events according to their determined characteristics.

14. The system of claim 12, the means for recording events including means for generating events.

15. The system of claim 12, the means for detecting events within an area of interest comprising means for detecting infrared radiation within an area of interest.

16. A method of identifying events of interest within a defined area, comprising:
    collecting raw sensor data representing a plurality of detected events in the defined area;
    analyzing the collected data to determine at least one characteristic associated with a given detected event;
    generating at least one event report representing respective events affiliated with the system, a given event report including at least one associated characteristic of an event affiliated with the system;
    matching the generated at least one event report to the plurality of detected events to determine which of the detected events are affiliated with the system; and
    filtering the detected events to remove the events affiliated with the system as to identify at least one event of interest.

17. The method of claim 16, the sensor data being analyzed at a first location and the at least one event report being generated at at least a second location.

18. The method of claim 16, further comprising allocating available sensor resources based upon at least one determined characteristic of the at least one event of interest.

19. The method of claim 16, wherein analyzing the collected data includes assigning an associated event class to a given detected event based upon the raw sensor data.

20. The method of claim 19, the at least one characteristic included in the at least one event report including an associated event type, and matching the at least one event report to the detected events includes comparing the respective event classes of the detected events to the associated event types included in the at least one event report.

* * * * *